United States Patent [19]
Beguin et al.

[11] 4,106,015
[45] Aug. 8, 1978

[54] RADAR SYSTEM WITH CIRCULAR POLARIZED TRANSMISSION AND ADAPTIVE RAIN DEPOLARIZATION COMPENSATION

[75] Inventors: Daniel E. Beguin, Saint-Prix; Henri J. Bosc; Jean-Marie H. Colin, both of Paris, all of France

[73] Assignee: International Standard Electric Corporation, New York, N.Y.

[21] Appl. No.: 735,460

[22] Filed: Oct. 26, 1976

[51] Int. Cl.² ............................................. G01S 9/60
[52] U.S. Cl. .............................. 343/5 W; 343/100 PE
[58] Field of Search .................... 343/5 W, 100 PE

[56] References Cited

U.S. PATENT DOCUMENTS

| | | | |
|---|---|---|---|
| 2,851,681 | 9/1958 | Cohn | 343/100 PE X |
| 3,044,062 | 7/1962 | Katzin | 343/100 PE |
| 3,234,547 | 2/1966 | Katzin | 343/100 PE X |
| 3,588,897 | 6/1971 | Konrad | 343/5 W X |
| 3,883,872 | 5/1975 | Fletcher | 343/100 PE |

Primary Examiner—T.H. Tubbesing
Attorney, Agent, or Firm—William T. O'Neil

[57] ABSTRACT

A radar system for transmitting pulsed circularly polarized wave, having two separate receiving channels corresponding to the two mutually orthogonal components of the received wave. Apparatus is included for detecting variations of phase between the two receiving channels and automatically adjusting amplitude and phase of at least one of the two channels in order to compensate for the depolarization effects of rain. For isolating rain return signals and bona fide target signals, the ordinary range gate of a tracking radar plus wide early and late gates are used, applicable to target and rain return signals, respectively.

11 Claims, 4 Drawing Figures

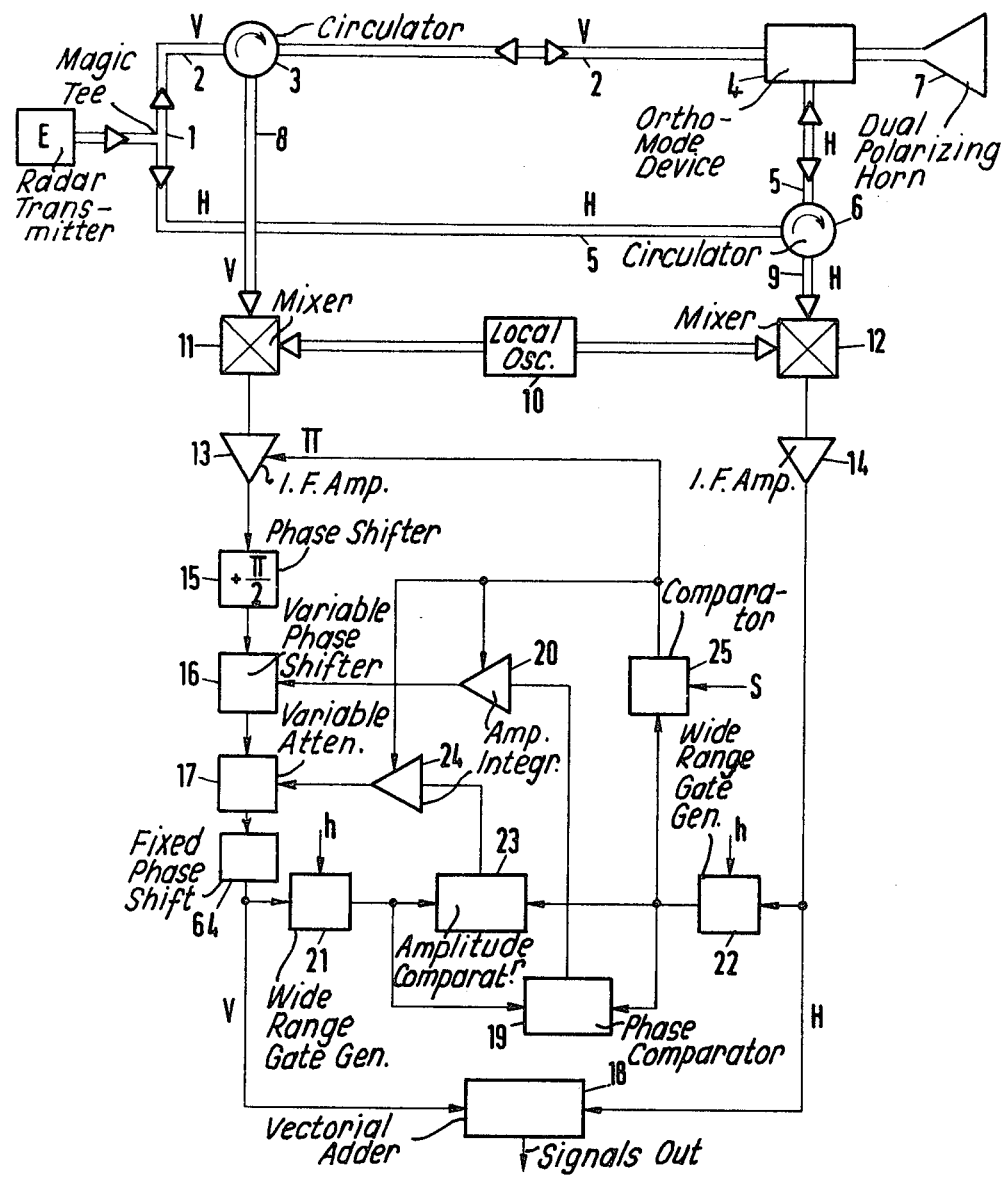
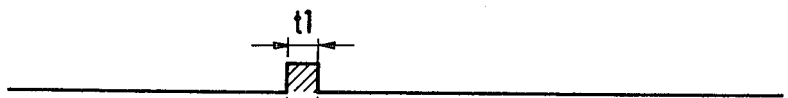
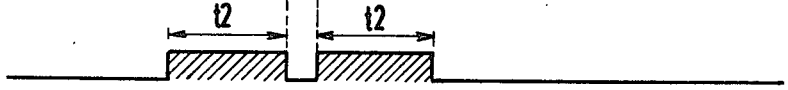
FIG.1
FIG.2a
FIG.2b

RADAR SYSTEM WITH CIRCULAR POLARIZED TRANSMISSION AND ADAPTIVE RAIN DEPOLARIZATION COMPENSATION

BACKGROUND OF THE INVENTION

1. Field of the Invention

The invention relates to apparatus for suppression of rain echoes in radar equipment.

2. Description of the Prior Art

When, in radar equipment, a point target to be detected and rain echo signals are found in the same radar resolution cell, considerable interference is caused. This rain interference becomes stronger as the radar wavelength used becomes shorter.

To overcome this problem, it has been common practice in prior art radars to employ circular polarization. In such arrangements, the radar transmits a circularly polarized wave obtained by means of a polarizer, such as the quarter-wave plate type, placed in front of the aperture of a linearly polarized horn antenna, for example with vertical polarization. The quarter-wave plate is orientated at $\pi/4$ to the vertical. The radiated electrical field component which is perpendicular to the quarter-wave plate is not affected, whereas the component which is parallel to the said plate is delayed in phase by $\pi/2$. Consequently, the output wave from the polarizer will be circularly polarized. Assuming that the rain is a perfectly isotropic medium in polarization and that the radar antenna is perfect, the wave reflected from the rain will still be circularly polarized. After passing through the polarizer, the component of the electrical field which is parallel to the quarter-wave plate will again be delayed in phase by $\pi/2$ and, after recombination with the component which is perpendicular to the said plate, will produce a horizontally polarized field which will not be accepted by the vertically polarized horn waveguide feeder. The rain echoes are thus eliminated while the target echo, in general anisotropic in polarization, is no longer circularly polarized and gives a useful signal not cancelled out.

In practice, the antenna is not perfect and the transmitted polarization is not exactly circular. Normally it is at least somewhat elliptical and characterized by an ellipticity radio $\tau$ defined as the ratio of the major axis to the minor axis of the ellipse defined by the electrical field vector. Consequently, the rain echoes are not completely eliminated. Thus, for example, for $\tau = 0.9$ dB (typical value), the suppression factor is 20 dB.

It has been assumed up to this point that the rain was a medium perfectly isotropic in polarization but actually it has at least some depolarizing effect. Measurements and calculations have shown that the rain is an anisotropic medium whose principal axes are the vertical axis and the horizontal axis. The horizontal component of the electrical field is attenuated more and delayed more than the vertical component. Consequently a circularly polarized transmitted wave will be changed into an elliptically polarized wave after crossing through a rain zone. The ellipticity ratio increases with the thickness of the rain zone traversed and the intensity of the precipitation. Thus, for example, for a rainfall having an intensity of 12.4 mm/h present over a 10 km path, the attenuation of the rain echoes is limited to 10.4 dB in the X band and 15.9 dB in the C band.

The manner in which the present invention deals with this problem by providing novel apparatus and function will be understood as this description proceeds.

SUMMARY OF THE INVENTION

It may be said to be the general objective of the present invention to provide more complete suppression of rain echoes, not only when the rain is in the vicinity of the target, but also when it is in the radar-target path.

A corollory accomplishment according to the invention is suppression of rain echoes with increased useful target signal level in the absence of rain around the target, as compared to a conventional prior art system operating constantly with circular polarization.

According to the invention, a self-adapting device for the suppression of the rain echoes in a radar system transmitting a circularly polarized wave is provided, characterized in that it includes (in a typical implementation):

two separate receiving channels which receive respectively the orthogonal components V and H of the reflected wave;

a variable phase shifter and a variable attenuator placed in one of the two receiving channels, and controlled respectively by a phase correction loop, of the second order for example, and an amplitude correction loop, of the second order for example;

a vectorial adder receiving the components V and H respectively, one of which is corrected for phase and a $\pi/2$ phase shifter placed in one of the two receiving channels so that two components V and H of the received circularly polarized waves are oppositely phased;

ment, the said description being taken with reference to the drawings.

BRIEF DESCRIPTION OF THE DRAWINGS

FIG. 1 shows a schematic block diagram of an embodiment according to the invention.

FIGS. 2.a and 2.b show the on times of the range gates of FIG. 1.

DESCRIPTION OF THE PREFERRED EMBODIMENT

Figure 3:
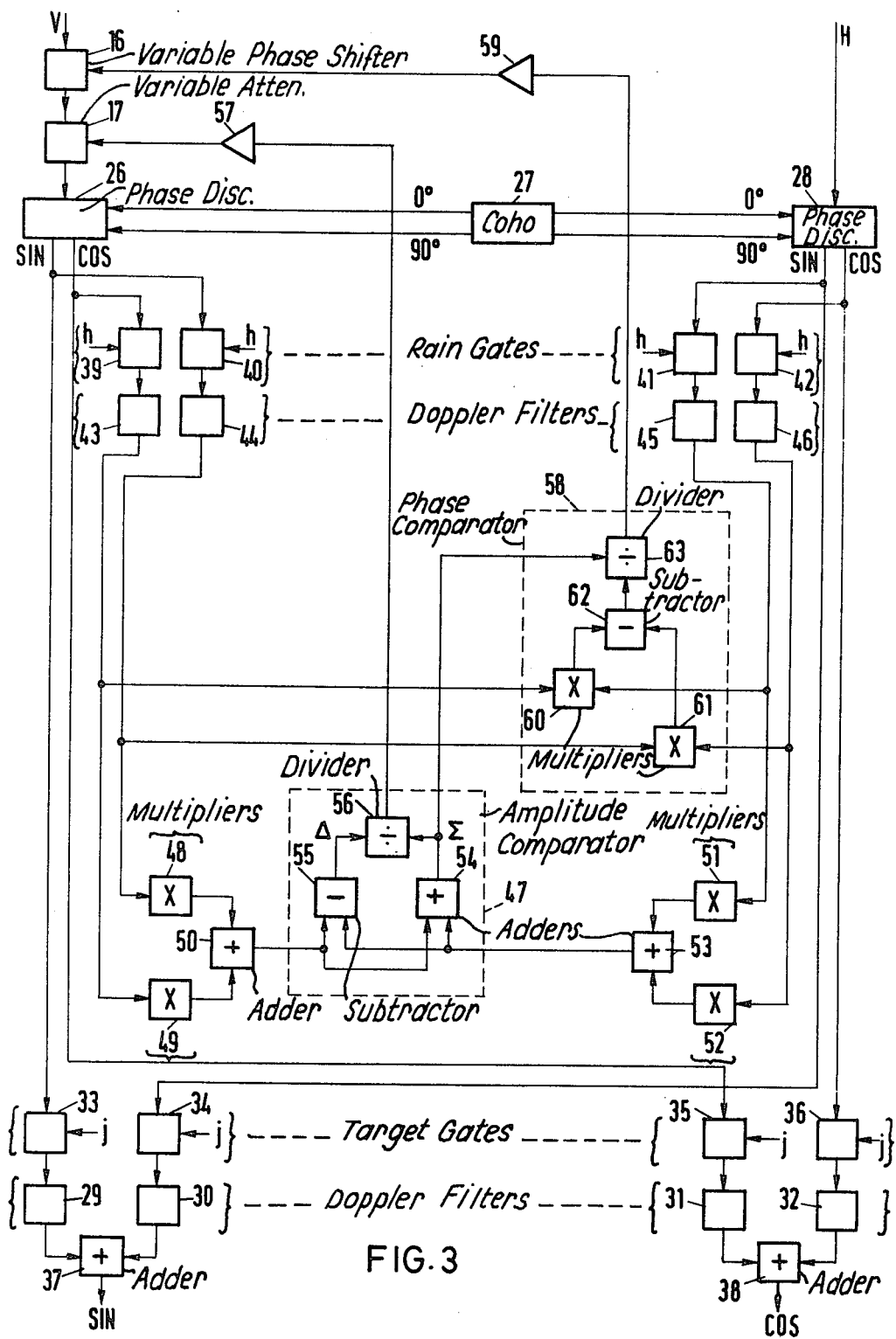
FIG. 3 depicts an alternative embodiment of the invention, in schematic-block diagram form.

In FIG. 1, the diagram of an embodiment of the rain echo suppression device according to the invention includes a radar transmitter, which will be called E, delivering a microwave signal divided into two orthogonal signal components V and H of same amplitude by means of a properly dimensioned magic tee 1. The electrical orientation of these two signal components can be vertical and horizontal respectively. A waveguide 2, in which a circulator 3 is inserted, transmits the component V of the wave to an orthomode device 4. This device also receives the component H of the wave through a waveguide 5 in which a circulator 6 is inserted. The lengths of waveguides 2 and 5 are such that the components V and H are in phase quadrature at the inputs of the orthomode device 4. This device then delivers a wave which is circularly polarized, right or left, depending upon whether the component H lags or leads by $\pi/2$ the component V. A circularly polarized wave is radiated by a dual polarizing horn 7, fed by the orthomode device 4. In receiving, the wave into horn 7 (after reflection from a target) is divided into its components V and H by the orthomode device 4. A waveguide 8, connected to circulator 3, conveys only the component V of the received wave, and a waveguide 9, connected to circulator 6, conveys only the component H. Accordingly, two microwave receiving channels are provided, these being channel V and channel H. To make the figure clear, the letter V is associated with circuit sections transmitting the component V of the wave and the letter H is associated with circuit sections transmitting the component H. If the depolarizing effect of the rain is disregarded by assuming that the rain is an isotropic medium in polarization, the received rain echo will be circularly polarized and the components V and H received in each of the receiving channels will be in phase quadrature and will have the same amplitude.

The microwave signals received in the two receiving channels are converted into intermediate frequency signals by means of a local oscillator 10, mixers 11 and 12 and intermediate frequency amplifiers 13 and 14. In order not to change the relation existing, on the one hand, between the phases and, on the other hand, between the amplitudes of the components V and H, mixers 11 and 12 as well as amplifiers 13 and 14 should have identical electrical characteristics as nearly as possible. A phase shifter 15 providing $+ \pi/2$ phase shift is placed in one of the two intermediate frequency receiving channels so that the components V and H of the rain echoes (assumed for the moment to be isotropic in polarization) are opposite in phase. It will be assumed for example, that the component H of the circularly polarized transmitted wave lags the component V by $\pi/2$, in which case the phase shifter 15 will be placed in the channel V as illustrated. This $+ \pi/2$ phase shift could be accomplished alternatively by modifying the length of waveguide in one channel with respect to the other.

A variable phase shifter 16 followed by a variable attenuator 17 are placed in the intermediate frequency receiving channel V, for example, at the output of the phase shifter 15. A vectorial adder 18, placed at the ends of the intermediate frequency receiving channels, receives on the one hand the component V after it passes through phase shifters 15 and 16 and attenuator 17 and, on the other hand, the component H from 14. Adder 18 delivers a signal which, after amplitude detection or phase detection (in the case of a Doppler radar) will be applied to the conventional signal processing of the conventional range gated radar for display, etc. The on time of the range (target) gates is short, which permits the target to be accurately located. In the following description, these gates will be called "target gates".

A phase correction loop, of the second order for example, contains a phase comparator 19 and an amplifier-integrator 20 controlling the variable phase shifter 16. The two inputs of phase comparator 19 are connected respectively to the intermediate frequency receiving channel V, supplied at the output of the variable attenuator 17 through a set of wide range gates generated in 21, and to the intermediate frequency receiving channel H through a set of wide range gates generated in 22, substantially identical to those from 21 and operating synchronously therewith. The function of the phase correction loop is to correct, in the resolution cell containing the target to be tracked, the phase shift variations with respect to $\pi/2$ between the components V and H due to the depolarizing effect of the rain. For this purpose, each of the gate sets generated in 21 and 22 contains as many wide gates as there are target gates in the radar, with each of the wide gates associated with a target gate. Wide gates are used so as to obtain a high level of rain noise in the correction loop. These wide gates will be called "rain gates" in the following description.

FIGS. 2.a and 2.b represent, respectively, the on time $t1$ of a given target gate and the on time of the associated rain gate. The rain gate is open for a time $t2$ before and after the target gate on time $t1$. In order not to superpose, at the output of phase comparator 19, a target echo signal on the phase error signal (due to the depolarizing effect of the rain) the rain gate is closed during the on time $t1$ of the target gate. During each radar repetition period, only the rain gate corresponding to the tracked target gate is opened by means of pulses $h$.

An amplitude correction loop, of the second order for example, completely independent of the phase correction loop, contains an amplitude comparator 23 and an amplifier-integrator 24 controlling the variable attenuator 17. The two inputs of the amplitude comparator 23 are connected to the intermediate frequency receiving channels V and H through the rain (wide) gate sets 21 and 22, in the same way as the inputs of the phase comparator 19. The function of this amplitude correction loop is to correct, in the resolution cell containing the target to be followed, differences in amplitude, due to the depolarizing effect of the rain, between the received components V and H.

The operation of the device which has just been described will now be explained in connection with the resolution cell containing the target to be tracked, that is to say a given target gate and its associated rain gate. When the rain is present in the vicinity of the target, i.e., in the associated rain gate, the components V and H of the received rain echo are found to be shifted in phase by $\pi + \Delta \phi$ at the inputs of the phase comparator 19, the term $\Delta \phi$ representing the phase shift due to the depolarizing effect of the rain. This term $\Delta \phi$ will be a function of the intensity of the precipitation and of the depth of the rain zone along the radar-target path. The phase comparator 19 is designed to deliver an error signal which is a function of $\Delta \phi$. The phase correction loop drives the variable phase shifter 16 so that the components V and H of the rain echo are opposite in phase. During the on time of the rain gate in question, the components V and H of the rain echo will be present at the inputs of the amplitude comparator 23 with different amplitudes. This difference in amplitude, which will be called $\Delta a$, is also due to the depolarizing effect of the rain. The amplitude comparator 23 delivers an error signal which is a function of $\Delta a$. The amplitude correction loop controls the variable attenuator 17 so that the components V and H of the rain echo will have the same amplitude. The vectorial adder 18 therefore receives two signals of the same amplitude but of opposite phase representing the rain echo. Consequently it delivers a zero rain noise to the target gate in question. On the other hand, it receives two signals of random amplitude and phase representing the target echo which has a polarization different from that of the rain. Thus the vectorial adder 18 delivers to the target gate a useful signal, of a value other than zero, representing the target echo only. The device thus automatically suppresses the rain echo in the target gate in question by varying the amplitude and phase in one of the two receiving channels, so as to compensate the depolarizing effects due to propagation through the rain.

When there is no rain in the vicinity of the target, i.e., in the associated rain gate, even if there is rain along the radar-target path, no rain echo is reflected to the radar antenna while the rain gate is open. No error signal is present at the output of the phase and amplitude comparators 19 and 23, and a useful signal other than zero, representing the target echo only, is present at the output of the vectorial adder 18.

In the diagram shown in FIG. 1, it will be noted that there is a variable attenuator-variable phase shifter set in only one receiving channel. Such a set could be placed in both of the receiving channels, so as to make the device more symmetrical. Of course, the two sets would function in opposite directions.

It is also possible to add to the preceding device a voltage comparator 25 with variable threshold S placed at the output of the rain gate set 22 receiving the signals of the incorrect channel H. The threshold voltage S corresponds to a rain whose equivalent radar surface is small compared to that of te target echo to be detected, and varies as a function of the distance; in fact, the more distant the target and the weaker the target echo, the smaller the threshold voltage will be. When the component H of the rain echo in the rain gate in question is smaller than the threshold S, a logical signal appears at the output of comparator 25, producing the on time of the phase and amplitude correction loops, for example by cutting off the integrator-amplifiers 20 and 24, and a phase shift of $\pi$ in one of the two receiving channels, for example in the intermediate frequency amplifier 13 of the channel V. Consequently the components V and H of a reflected circularly polarized wave will be in phase, and the system operates as if the radar was operating with linear polarization. This operation improves the useful target signal which is more attenuated in circular polarization, an effect which is the usual situation in prior art systems.

In all of the above description, the wave transmitted by the antenna was assumed to have been circularly polarized. In reality, the polarization is elliptical, due largely to imperfections in the antenna. The device according to the invention permits these imperfections to be compensated, on reception, by introducing a permanent fixed additional phase shift and a fixed additional attenuation in one of the two receiving channels. The additional phase shift can for example be introduced by the phase shifter 15 or by the variable phase shifter 16. In FIG. 1, a fixed phase shift 64 is illustrated for this purpose, it being understood that this is another way of providing the transmission ellipticity correction. The additional attenuation can otherwise be introduced by a control bias in the variable attenuator 17.

Another embodiment of the system for suppression of rain echoes according to the invention is shown in FIG. 3. This embodiment be can be used in a coherent pulse Doppler radar and permits the suppression of the rain echoes even in the presence of fixed echoes. The microwave section, as well as the circuits for obtaining the two intermediate frequency channels V and h and the + $\pi/2$ phase shifter in the channel V, are identical to the above mentioned circuits and are not shown. Again, the variable phase shifter 16 and the variable attenuator 17 are placed in one of the two intermediate frequency channels, for example in the channel V. A phase discriminator 26, connected, on the one hand, to the output of the variable attenuator 17 and, on the other hand, to the output of a stable oscillator 27, often called a coherent oscillator (COHO), delivers the Doppler frequency signal. Two signals, shifted by $\pi/2$, are supplied by the coherent oscillator 27, so that the phase discriminator 26 delivers the sine and cosine components of the Doppler signal. These two components must be known in order to determine the direction of displacement of the targets with respect to the antenna. A second phase discriminator 28, located in the channel H and connected in the same way to the coherent oscillator 27, delivers the sine and cosine components of the Doppler frequency signal related to the channel H.

The sine and cosine components of the Doppler signal of the channels V and H are sent respectively to four identical Doppler filters 29, 30, 31 and 32, through four identical target gate sets 33, 34, 35 and 36, all controlled by the same signals $j$. The said target gate sets and the said Doppler filters are conventional elements of coherent pulse Doppler radars permitting the detection of moving targets at a given range. An adder 37, whose inputs are connected to the outputs of Doppler filters 29 and 30, delivers the sine component of the target echo Doppler signal alone, the rain echo being eliminated as described below. Likewise, adder 38, whose inputs are connected to the outputs of Dopper filter 31 and 32, delivers the cosine components of the target echo Doppler signal alone.

The sine and cosine components of the Doppler signal of the channels V and H are also sent to the phase and amplitude correction chains through four identical rain gate sets 39, 40, 41 and 42 followed by Doppler filters 43, 44, 45 and 46, respectively. These Doppler filters can have cut-off frequencies different from those of Doppler filters 29 to 32. Each of the rain gate sets 39 to 42 is controlled by the same signals h and, as in the case of FIG. 1, contains as many rain gates as there are target gates from the tracking radar (not illustrated). The on times of a target gate and its associated rain gate, identical to the case in FIG. 1, are shown in FIGS. 2.$a$ and 2.$b$.

the amplitude correction loop contains an amplitude comparator 47 receiving respectively the square of the amplitude of the Doppler signal of channel V, and the square of the amplitude of the Doppler signal of channel H. For the channel V, this square is obtained by means of two multipliers 48 and 49, raising respectively to the square, the sine and cosine components of the Doppler signal of channel V, and an adder 50 which eliminates the phase terms and delivers only an amplitude term. For the channel H, this square is obtained by means of two multipliers 51 and 52 followed by an adder 53. The amplitude comparator 47 produces the sum $\Sigma$ and the difference $\Delta$ of the received signals, by means of an adder 54 and a subtractor 55. It delivers the quotient $\Delta/\Sigma$, obtained by a quotient computer 56. This result is sent through an integrator-amplifier 57 to the control input of the variable attenuator 17. The result $\Delta/\Sigma$ is independent of the level of the signals received by the radar antenna.

The phase correction loop contains a phase comparator 58 followed by an integrator-amplifier 59. The phase comparator 58 includes a first multiplier 60 whose two inputs are connected respectively to the outputs of Doppler filters 43 and 45, and whose output is the product of the cosine component of the Doppler signal of channel V and the sine component of the Doppler signal of channel H. A second multiplier 61, whose two inputs are connected respectively to the outputs of Doppler filters 44 and 46, delivers the product of the sine component of the Doppler signal of channel V and the cosine component of the Doppler signal of channel H. A subtractor 62, placed at and responsive to the output of the two multipliers 60 and 61, delivers a signal in the form sin Δ φ, the term Δφ representing the phase error due to the depolarizing effect of the rain. Since the term Δ φ is small, it can be likened to its sine. A quotient computer 63, placed at the output of the subtractor 62, divides the result of the said subtractor by the sum Σ delivered by adder 54. Thus the output signal from phase comparator 58 represents only the phase error Δφ, and is independent of the level of the signals received by the radar antenna.

The target gates and rain gates are controlled in the same way as in the case of FIG. 1, but there, due to the presence of Doppler filters in the phase and amplitude correction loops, the correction signals are generated from the phase shift and attenuation caused by the rain alone, without taking the fixed objects into account. The arrangement of FIG. 3 will therefore operate correctly even in the presence of fixed echoes.

Once the concepts of the invention are understood, those skilled in this art can obviously introduce other variations and modifications within the scope of the invention. For one example of such variations, in the second embodiment described in FIG. 3, the phase and amplitude corrections carried out in the intermediate frequency channel V could be carried out at the output of the phase discriminator 26, on the Doppler frequency signal. Accordingly, it is not intended that the scope of the invention be limited by the drawings or this description, these being typical and illustrative only.

What is claimed is:

1. An adaptive device for the suppression of the rain echoes in a radar system transmitting a circularly polarized wave, comprising:

a pair of separate receiving channels which receive, respectively, the mutually orthogonal components V and H of the reflected wave;

first means including a π/2 phase shifter placed in one of said receiving channels so that the two components V and H of the received circularly polarized waves are nominally oppositely phased;

second means including a variable phase shifter and a variable attenuator placed in at least one of said two receiving channels, and controlled, respectively, by a phase correction loop, of the second order and amplitude correction loop, of the second order, said phase correction loop comprising a phase comparator whose inputs are connected, respectively, through wide range rain gates, to channel V and to channel H, one of which is corrected, with the output of said phase comparator delivering a phase error signal which is a function of the phase shift Δφ with respect to π/2 of the components V and H of received rain echo;

and a vectorial adder receiving the components V and H respectively from said second means, one of which is corrected for phase and amplitude, and delivering the useful target echo signal to the conventional radar circuits.

2. A device according to claim 1, further defined in that the amplitude correction loop contains an amplitude comparator whose inputs are connected respectively, through said wide range rain gates, to the channel V and the channel H, one of which is corrected, with the output of the said amplitude comparator delivering an amplitude error signal which is a function of the difference in amplitude Δa between the components V and H of the received rain echo.

3. A device according to claim 2, further defined in that the number of the said rain gates is equal to that of the conventional target gates of the radar, and in that the rain gate associated with a given target gate is open during a time interval t2 before and after the on time t1 of the target gate, and closed during this time t1.

4. A device according to claim 1 which includes a comparator with variable threshold S whose input is connected, through the said rain gates, to the uncorrected receiving channel, and whose logical output signal has the effect, when the input signal is below threshold S, of introducing an additional phase shift of π in one of the two receiving channels and of opening the phase and amplitude correction loops.

5. A device according to claim 1, characterized in that radar antenna imperfections, which cause the transmitted wave to be elliptically polarized rather than circularly polarized, are compensated on reception by means for introducing a fixed phase shift and a fixed attenuation in one of the two receiving channels.

6. A device according to claim 1, incorporated in a coherent pulse Doppler radar which delivers, for each of the channels V and H, the sine and cosine components of the Doppler signal related to these channels, characterized in that four identical target gate sets, each followed by a Doppler filter, receive respectively the sine and cosine components of the Doppler signal of each of the channels V and H.

7. A device according to claim 6, further defined in that a first adder is placed at the output of the two Doppler filters receiving the sine components of the Doppler signals of the chanels V and H, and in that a second adder is placed at the output of the two Doppler filters receiving the cosine components of the Doppler signals of the channels V and H.

8. A device according to claim 6 further defined in that the said amplitude correction loop contains an amplitude comparator receiving a signal at each of its two inputs which represents the square of the amplitude of the Doppler signal of the channels V and H respectively, this signal being supplied by a computing circuit for each input of the amplitude comparator, the said computing circuits receiving the sine and cosine components of the channels V and H respectively, through four identical rain gate sets, each followed by a Doppler filter.

9. A device according to claim 8, in which said amplitude comparator comprises means for carrying out the quotient Δ/Σ of the difference Δ of the squares of the amplitudes of the Doppler signals between the channels V and H by the sum Σ of these squares, so as to deliver an amplitude error signal independent of the level of the signal received by the radar antenna.

10. A device according to claim 8 further defined in that the said phase correction loop contains a phase comparator receiving the sine and cosine components of the Doppler signal of the channels V and H, through the said four rain gate sets followed by the said Doppler filters.

11. A device according to claim 10, in which said phase comparator includes apparatus to produce, on the one hand, the product of the sine component of the Doppler signal of channel V and the cosine component of the Doppler signal of channel H, on the other hand, the product of the cosine component of the Doppler signal of channel V and the sine component of the Doppler signal of channel H, then the difference between the two products obtained, and finally the quotient of the difference obtained by the said sum Σ, so as to deliver a phase error signal independent of the level of the signal received by the antenna.

* * * * *